US009320985B2

(12) United States Patent
Scherffius

(10) Patent No.: US 9,320,985 B2
(45) Date of Patent: Apr. 26, 2016

(54) CONFIGURATIONS AND METHODS OF GENERATING LOW-PRESSURE STEAM

(75) Inventor: Jeffrey Scherffius, Laguna Nigel, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 494 days.

(21) Appl. No.: 13/390,024

(22) PCT Filed: Aug. 11, 2009

(86) PCT No.: PCT/US2009/053370
§ 371 (c)(1),
(2), (4) Date: Apr. 27, 2012

(87) PCT Pub. No.: WO2011/019335
PCT Pub. Date: Feb. 17, 2011

(65) Prior Publication Data
US 2012/0204817 A1    Aug. 16, 2012

(51) Int. Cl.
*F22B 35/00* (2006.01)
*B01D 3/32* (2006.01)
*F01K 25/04* (2006.01)

(52) U.S. Cl.
CPC ............. *B01D 3/322* (2013.01); *F01K 25/04* (2013.01); *Y02P 70/34* (2015.11)

(58) Field of Classification Search
USPC .......... 122/7 R, 470, 1 R, 411, 441, 442, 443, 122/484, 485, 486
See application file for complete search history.

(56) References Cited

U.S. PATENT DOCUMENTS

| | | | |
|---|---|---|---|
| 3,213,833 A * | 10/1965 | Cunningham et al. | 122/34 |
| 3,442,613 A | 5/1969 | Grotz, Jr. | |
| 3,666,828 A | 5/1972 | Post et al. | |
| 4,555,310 A | 11/1985 | Marrelli | |
| 4,829,938 A * | 5/1989 | Motai et al. | 122/7 R |
| 4,930,316 A * | 6/1990 | Bonham, Jr. | 60/641.5 |
| 5,330,618 A * | 7/1994 | Daniels et al. | 159/47.1 |
| 8,091,361 B1* | 1/2012 | Lang | 60/654 |
| 8,118,895 B1* | 2/2012 | Wen et al. | 48/198.3 |
| 2002/0102200 A1 | 8/2002 | Jungerhans | |
| 2004/0059070 A1 | 3/2004 | Whitte et al. | |
| 2008/0276617 A1* | 11/2008 | Mak | 60/728 |

(Continued)

FOREIGN PATENT DOCUMENTS

| | | |
|---|---|---|
| EP | 0113530 | 7/1984 |
| JP | 2003222301 | 8/2003 |
| JP | 2003343212 | 12/2003 |
| JP | 2010121916 | 6/2010 |

(Continued)

OTHER PUBLICATIONS

P.I. Voskresenskiy, "Technique of laboratory works", M1973, pp. 449-450, fig. 380.

*Primary Examiner* — Gregory A Wilson
(74) *Attorney, Agent, or Firm* — Conley Rose, P.C.; Kristin Jordan Harkins

(57) ABSTRACT

Low-pressure steam for a steam consuming device, and particularly a steam reboiler, is generated at the steam consumption pressure to maximize the heat recovery from a utility fuel and/or waste heat source. Most preferably, steam is generated at the lowest possible pressure by fluidly coupling the steam generator to the steam consuming device (e.g., by integrating the condensate drum with the steam drum). Therefore, it should be appreciated that the steam generator pressure in such configurations and methods will ride on the reboiler pressure.

16 Claims, 2 Drawing Sheets

(56) References Cited

U.S. PATENT DOCUMENTS

2010/0126433 A1    5/2010  Kozaki
2012/0055158 A1*  3/2012  Berger et al. .................. 60/645
2014/0026755 A1*  1/2014  Johnson et al. ................ 95/260

FOREIGN PATENT DOCUMENTS

| WO | 03002459 | 1/2003 |
| WO | 2007/075466 | 7/2007 |
| WO | 2007113308 | 10/2007 |

* cited by examiner

CONFIGURATIONS AND METHODS OF GENERATING LOW-PRESSURE STEAM

FIELD OF THE INVENTION

The field of the invention is devices and methods of low-pressure steam generation at steam consumption pressure for steam consuming devices.

BACKGROUND OF THE INVENTION

Steam is used is numerous plants and methods to provide utility heating to reboilers and other devices. For example, steam heaters are commonly used in the stripper reboiler of an amine plant (e.g., those using the ECONAMINE FG PLUS$^{SM}$ (Fluor Technologies Corp.) process) for regeneration of a solvent for $CO_2$ capture. While the required steam pressure in the reboiler is typically determined by the specific reboiler configuration and process demand, the available steam pressure in most plants is often dictated by an external utility system and is invariably higher than the pressure required by the reboiler, as in most known systems steam is generated at fixed pressure intervals. Consequently, heat recovery in the steam generation process is less than desirable. Moreover, steam generation in external utility systems often precludes waste heat recovery from various sources.

Consequently, although various configurations and methods for steam production are known in the art, all or almost all of them suffer from one or more disadvantages. Thus, there is still a need to provide improved methods and configurations for steam production, and especially low-pressure steam production.

SUMMARY OF THE INVENTION

The present invention is directed to devices and methods of steam generation for one or more steam consuming devices where the steam is generated by and delivered from the steam generator at about the same pressure at which the steam condenses in the steam consuming device. Thus, as the steam is generated at the consumption pressure, more heat can be recovered from the heat source(s) used in the steam generation.

In one aspect of the inventive subject matter, a plant includes a steam generator that is coupled to a steam consuming device, wherein the steam generator produces steam at a pressure that is substantially equal to the condensing pressure of the steam in the steam consuming device. At least one heat source is thermally coupled to the steam generator to provide heat sufficient for converting the steam condensate from the steam consuming device into steam.

Most preferably, a vessel is coupled to the steam generator and the steam consuming device such that the vessel receives the steam from the steam generator and such that the vessel receives the steam condensate from the steam consuming device. Consequently, it should be appreciated that one or more heat sources (e.g., waste heat source) and/or the steam generator may be located in separate locations. Where desired, additional low-pressure steam may be provided to the steam consuming device by a conventional steam production unit or other steam source (e.g. steam turbine exhaust).

Viewed from another perspective, a plant may therefore comprise a steam generator and a steam consuming device that are coupled together in a closed cycle configuration such that the steam generator is able to produce and deliver steam at a pressure that is substantially equal to the condensing pressure of the steam in the steam consuming device. Most typically, the closed cycle further includes a vessel that can receive the steam from the steam generator and that can receive the steam condensate from the steam consuming device. It is further contemplated that such plants will have at least one or two distinct heat sources (e.g., waste heat, heat transfer fluid, recuperator, etc.) that provide heat to convert the steam condensate into (typically low-pressure) steam having a pressure of equal or less than 50 psia.

Therefore, the inventor also contemplates a method of operating a steam consuming device in which steam is formed in and delivered from a steam generator at a pressure that is substantially equal to a condensing pressure of the steam in the steam consuming device. Most typically, the step of forming the steam in the steam generator is performed using a heat transfer fluid and/or waste heat source. It is still further generally preferred that the steam consuming device and the steam generator are coupled together by a vessel such that the vessel can receive the steam from the steam generator and such that the vessel can receive the steam condensate from the steam consuming device without substantial change in pressure (e.g., compression in a compressor or expansion in an expansion device). If needed, or where otherwise desired, additional steam can be delivered from a second steam generator (typically a conventional steam generator or steam turbine exhaust) to the steam consuming device at a suitable pressure. Alternatively, or additionally, excess steam beyond what is required at the steam consuming device can be generated and exported from the system for use in a separate steam consuming device. Most typically, the steam consuming device is a steam reboiler of a solvent regenerator, and the low-pressure steam has a pressure of equal or less than 50 psia.

Various objects, features, aspects and advantages of the present invention will become more apparent from the following detailed description of preferred embodiments of the invention.

DETAILED DESCRIPTION

The present invention is directed to devices and methods for steam generation, and especially low-pressure steam generation in which the steam is generated substantially at the pressure required by the steam consuming device. It should be appreciated that by lowering the steam generation/supply pressure to the required steam consumption pressure, the heat recovered in the steam generation process is maximized, thereby rendering the process more efficient. Moreover, contemplated systems and methods also allow waste heat to be used (e.g., for steam in solvent regeneration) from one or more waste heat sources, which further significantly lowers operating cost of a plant.

For example, in one especially preferred aspect of the inventive subject matter, steam is generated at the lowest possible pressure by having the steam generator fluidly connected to the steam consumer (e.g., reboiler). Most preferably, such low-pressure steam generation can be achieved by integrating the reboiler condensate drum with the steam drum into the same vessel. Consequently, the steam generator pressure will then ride on the reboiler pressure. Such configurations and methods can advantageously be implemented in plants where the so generated steam is the only heat source or used as a supplemental heat source.

Most preferably, contemplated plants will therefore include a steam generator that is fluidly coupled to a steam consuming device, wherein the steam generator produces steam at a pressure that is substantially equal to the condensing pressure of the steam in the steam consuming device. Most typically, one or more heat sources are thermally coupled to the steam generator and configured to provide heat sufficient for converting the steam condensate into the steam. Thus, and viewed from a different perspective, a plant is contemplated that includes a steam generator and a steam consuming device coupled together in a closed cycle configuration such that the steam generator is able to produce and deliver steam at a pressure that is substantially equal to the condensing pressure of the steam in the steam consuming device.

Figure 1:
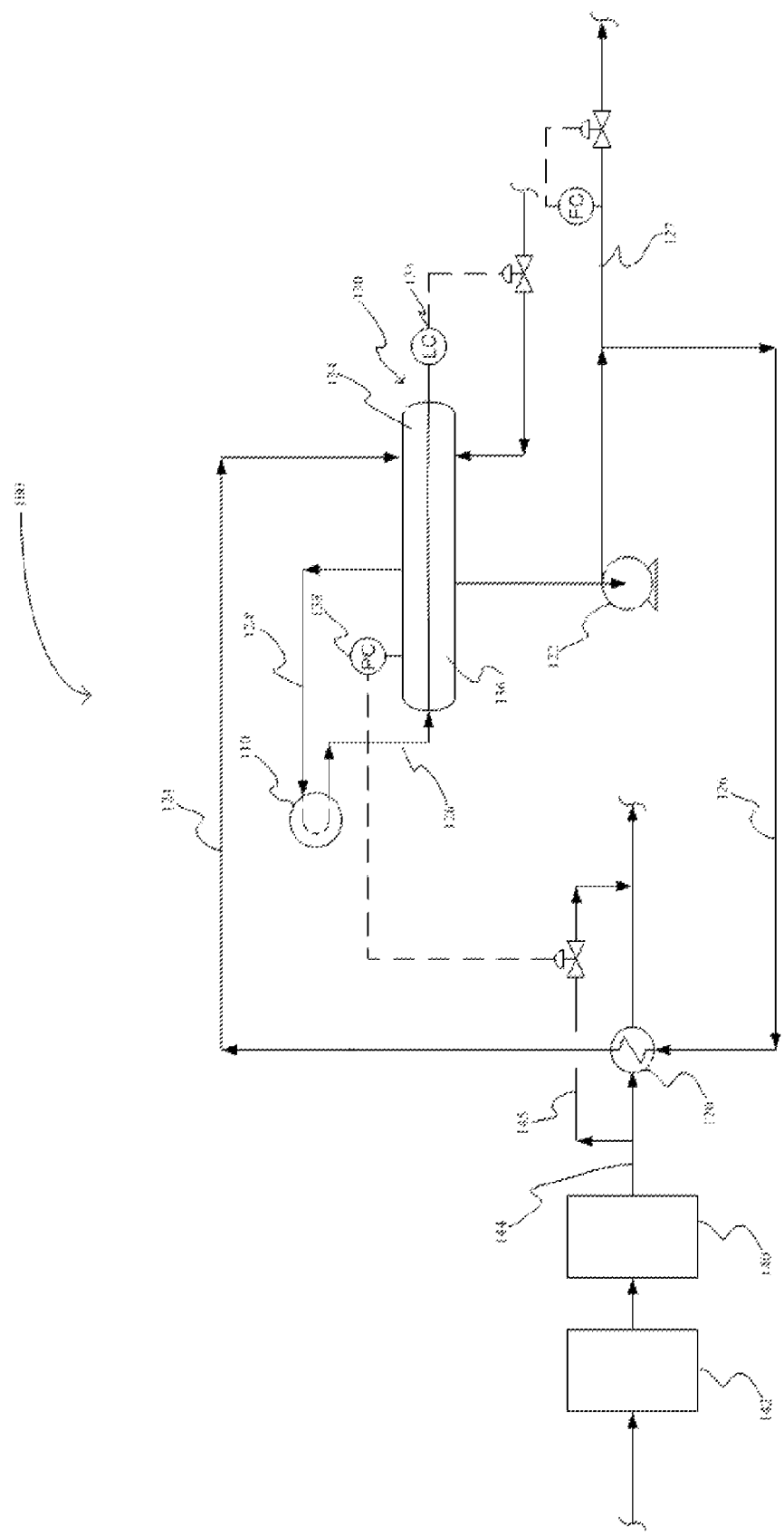
FIG. 1 is an exemplary schematic illustration of one steam production system according to the inventive subject matter, showing a configuration that is self-contained.

One exemplary configuration is schematically depicted in FIG. 1 where the steam generation unit 100 has a reboiler 110 of a solvent regenerator column as steam consuming device. Steam generator 120 is thermally coupled to heat sources 140/142, respectively, most typically via heat transfer fluid circuit 144. While it should be appreciated that any heat transfer fluid is deemed suitable for use herein so long as the heat transfer fluid provides sufficient heat for steam generation, especially preferred heat transfer fluids include various flue gases. Further suitable heat transfer fluids include liquid heat transfer media, and even steam. Steam condensate is provided via steam condensate line 126 to the steam generator where at least a portion of the condensate is vaporized, and the steam formed in the steam generator along with the remaining condensate is delivered via steam line 124. Typically, 10% to 30% of the condensate fed to the steam generator is vaporized into steam. Thus, stream 124 will be a two phase stream, typically with a mass vapor fraction of 0.1 to 0.3. Steam 134 is separated from the remaining condensate in vessel 130 that is configured as integrated steam/condensate drum. Steam 134 is then delivered to the reboiler via steam delivery line 124' (substantially completely vapor) and the condensate formed in the reboiler is routed back to the vessel via steam condensate delivery line 126' (substantially completely liquid) where it is stored as condensate 136. Condensate pump 122 pumps the condensate to the steam generator to so close the steam/condensate closed cycle. Alternatively, the steam/condensate loop could be closed without the pump via natural convection by properly elevating and positioning the steam/condensate drum 130 and steam generator 120. Line 127 can be used to remove condensate as a blowdown stream for composition control and boiler feed water is provided to the vessel for make-up via level control unit 133. The steam pressure is preferably controlled via pressure control unit 138 that in the example of FIG. 1 determines the flow of the heat transfer fluid through bypass 145 (i.e. heat input at steam generator 120).

Figure 2:
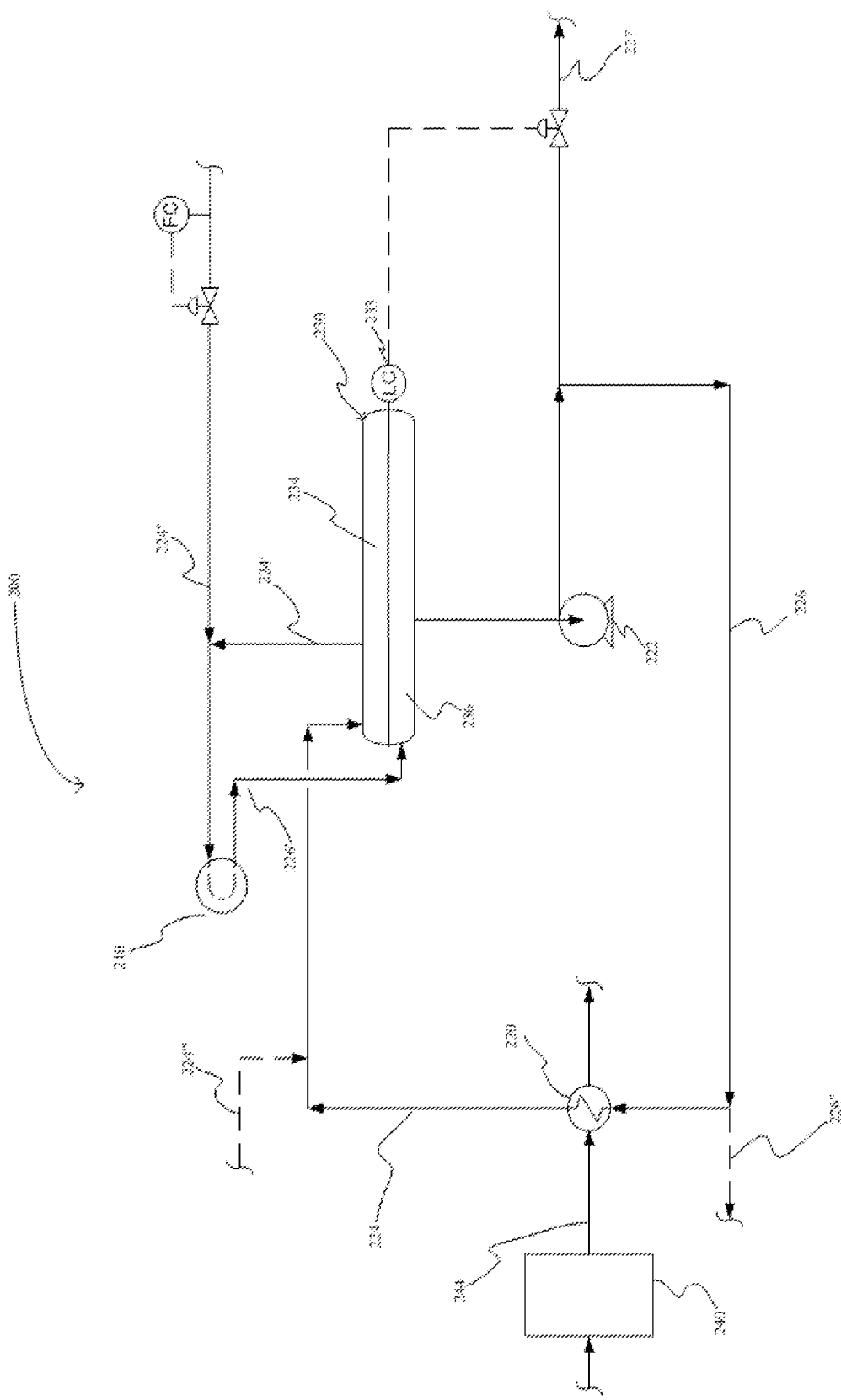
FIG. 2 is an exemplary schematic illustration of another steam production system according to the inventive subject matter, showing a configuration that uses supplemental steam and optionally uses multiple heat sources.

Alternatively, supplemental steam heat is provided to a plant as exemplarily and schematically shown in the steam generation unit 200 of FIG. 2. Here, a reboiler 210 of a solvent regenerator column as steam consuming device. Steam generator 220 is thermally coupled to heat source 240 via a heat transfer fluid circuit 244. Additional steam generators and/or heat sources may be implemented via additional steam line 224''' (carrying typically between 10-30% vapor in a two-phase stream) and additional steam condensate line 226''. The steam formed in the steam generator(s) is delivered via steam line 224 (carrying typically between 10-30% vapor in a two-phase stream), which contains the steam and remaining condensate, and steam condensate is provided to the steam generator(s) via steam condensate line 226. Steam 234 is separated from the remaining condensate in vessel 230 that is configured as integrated steam/condensate drum. Steam 234 is then delivered to the reboiler 210 via steam delivery line 224' (substantially completely vapor) and mixed with main steam delivery line 224''. The condensate formed in the reboiler is routed back to the vessel via steam condensate delivery line 226' (substantially completely liquid) where it is stored as condensate 236. Condensate pump 222 pumps the condensate to the steam generator(s) to so close the supplemental steam/condensate cycle. Alternatively, the steam/condensate loop could be closed without the pump via natural convection by properly elevating and positioning the steam/condensate drum 230 and steam generator 220. Line 227 is then used to route steam condensate back to the main steam generator (not shown) and is typically controlled by level control unit 233. Further heat sources, steam generators, regulation of levels and pressures can be achieved as schematically illustrated in FIG. 2.

In the exemplary configurations of FIGS. 1 and 2, it should be noted that the steam from the steam generator provides the heat to the reboiler, and that the reboiler steam pressure is indirectly manipulated. Most typically, such indirect regulation of steam pressure at the steam consuming device can be achieved in numerous manners, however, it is especially preferred that the pressure is regulated by adjusting the "make-up" steam and/or by adjusting the heat input at the steam generator such that the heat input required by the process is met at the reboiler. Therefore, as the required pressure rises or falls with the generation pressure, heat recovery is always maximized. Still further contemplated configurations include those in which multiple heat sources are manifolded together (e.g., where multiple boilers all ride on the reboiler condensing pressure) or where excess steam is generated, those in which steam is exported to other steam consuming devices.

Other possible manners of transferring the heat from a heat source to the reboiler or other steam consuming device include conventional steam generation systems or direct heat exchange. Alternatively, utility steam is supplied by taking steam from a power generating steam turbine at an intermediate stage (e.g., in a power plant). While in such plants steam is removed from the power generation cycle and power plant electrical output is so reduced, it should be appreciated that so minimization of steam generation/consumption may compensate for such disadvantage.

Of course, it should be recognized that contemplated systems and methods may be modified in various manners without departing from the inventive concept presented herein. For example, while it is preferred that contemplated systems and methods employ a single integrated vessel that is fluidly coupled to the steam generator and the steam consuming device such that the vessel is able to receive the steam from the steam generator and receive the steam condensate from the steam consuming device, it is also contemplated that the vessel may be separated into two distinct but fluidly connected vessels that operate at substantially the same (e.g., with a deviation less than 10% abs.) pressure. In such systems and methods, steam may be collected in one or more vessels while condensate may be collected in yet further vessels.

Furthermore, it should be noted that while preferred heat sources are waste heat sources, numerous other heat sources are also deemed suitable and include reactor effluent heat (e.g., from catalytic cracking or hydrogenation, reforming, partial oxygenation, Claus furnace, etc.) and combustion heat. Therefore, and depending on the nature and location of the heat source(s), multiple heat sources may be employed in the steam generation according to the inventive subject matter, or the same heat source may provide heat at multiple process points. Similarly, multiple and distinct heat sources may be arranged in series to heat a heat transfer fluid or the condensate/make-up boiler feed water to a point sufficient for steam generation at the desired pressure. Consequently, it is especially preferred that the heat source directly provides the heat to the steam generator (e.g., using turbine exhaust). Alternatively, the heat transfer medium may also be a fluid or steam and so deliver the heat to the steam generator. Thus, it should be noted that the heat source(s) and the steam generator may be located in separate locations, and even more advantageously, that the steam generator and the steam consuming device can be physically separated.

Depending on the particular nature of the heat source, steam generator, and/or steam consuming device, it is noted that the pressure of the steam may vary considerably. However, it is generally preferred that the steam has a pressure of less than 500 psia, more typically less than 250 psia, even more typically less than 100 psia, and most typically less than 50 psia.

Therefore, it should be recognized that contemplated methods include also a method of operating a steam consuming device (e.g., steam reboiler of a solvent regenerator) in which in one step steam is formed in and delivered from a steam generator at a pressure that is substantially equal (typically less than 20% deviation, more typically less than 10%, and most typically less than 5% deviation) to a condensing pressure of the steam in the steam consuming device. Viewed from a different perspective, deviations in pressure between the steam generator and the steam consuming device will typically be such that the difference compensates for line loss pressure drops. Therefore, larger differences are suitable at larger distances between the steam generator and the steam consuming device. As noted already before, it is generally preferred that the steam is formed in the steam generator using waste heat or other available heat, often at a location other than the location of the steam generator. Thus, it should be appreciated that waste heat may be used to form steam from a steam condensate.

In especially preferred aspects of contemplated methods, the steam consuming device and the steam generator are fluidly coupled together by a vessel such that the vessel is able to (a) receive the steam from the steam generator and (b) receive the steam condensate from the steam consuming device. Alternatively, multiple separate vessels may be used that are coupled together such that one or more vessels collect steam condensate while others collect steam, wherein at least two of these vessels are coupled together such that they operate at substantially the same pressure. As further noted above, contemplated configurations and methods may be implemented as stand-alone steam providers or in a configuration where supplemental steam is delivered to a steam consuming device next to utility steam at the pressure needed at the steam consuming device.

In view of the foregoing it should therefore be appreciated that contemplated system and methods provide multiple advantages over currently known configurations and methods. For example, the heat source for steam generation and the steam consuming device (e.g., the reboiler) can be physically separated and therefore avoid complex ducting and/or piping arrangements. Moreover, hydraulic requirements of the reboiler system or other steam consuming device can be preserved. Still further, the skin temperature of the reboiler tubes or other heat transfer surface is not affected by the temperature of the heat source, thereby avoiding problems associated with excessive temperatures in the reboiler system, such as thermal degradation of the process fluid. A yet further advantage of contemplated configurations and methods is that multiple heat sources can be utilized to generate a combined steam flow, thereby keeping the reboiler configuration or other steam consuming devices simple.

While it is generally preferred that the systems and methods of the inventive subject matter are preferably used in a reboiler of a solvent regenerator, it should be noted that the configurations and methods may be employed in numerous alternative uses, and indeed in any situation where low-pressure steam heating is required. Most advantageously, contemplated systems and methods are implemented in plants that have significant levels of low level waste heat (e.g., in a power plant, hydrotreating and/or hydrocracking plant, sulfur recovery plant, a syngas producing plant, a Fischer-Tropsch plant, etc.). However, it is especially preferred that contemplated configurations and methods are implemented in a flue gas treatment system, and especially in a retrofit project that has excess waste heat.

Thus, specific embodiments and applications for low-pressure steam generation have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A plant comprising:
   a steam generator that is fluidly coupled to a steam consuming device, wherein the steam generator is configured to produce a steam at a pressure that is substantially equal to a condensing pressure of the steam in the steam consuming device;
   at least one heat source that is thermally coupled to the steam generator, wherein the at least one heat source is configured to provide heat sufficient for converting a steam condensate from the steam consuming device into the steam; and
   a vessel that is fluidly coupled to the steam generator and the steam consuming device such that the vessel is able to (a) receive the steam from the steam generator and (b) receive the steam condensate from the steam consuming device.

2. The plant of claim 1 wherein the at least one heat source and the steam generator are located in separate locations.

3. The plant of claim 1 wherein the at least one heat source is a waste heat source.

4. The plant of claim 1 further comprising a second heat source, and wherein the at least one heat source and the second heat source are configured to provide heat sufficient for converting the steam condensate into the steam.

5. The plant of claim 1 further comprising an additional low-pressure steam production unit that is fluidly coupled to the steam consuming device.

6. A plant comprising a steam generator and a steam consuming device that are coupled together in a closed cycle configuration such that the steam generator is able to produce and deliver a steam at a pressure that is substantially equal to a condensing pressure of the steam in the steam consuming device, wherein the closed cycle further comprises a vessel that is fluidly coupled to the steam generator and the steam consuming device such that the vessel is able to (a) receive the steam from the steam generator and (b) receive the steam condensate from the steam consuming device.

7. The plant of claim 6 further comprising at least one heat source that is configured to provide heat sufficient for converting a steam condensate into the steam.

8. The plant of claim 7 wherein the at least one heat source comprises a waste heat source.

9. The plant of claim 6 wherein the pressure is equal or less than 50 psia.

10. A method of operating a steam consuming device, comprising a step of (i) forming steam in a steam generator, wherein a portion of the steam is formed from a steam condensate of the steam consuming device and (ii) delivering the steam from the steam generator at a pressure that is substantially equal to a condensing pressure of the steam in the steam consuming device, and wherein the steam consuming device and the steam generator are fluidly coupled together by a vessel such that the vessel is able to (a) receive the steam from the steam generator and (b) receive the steam condensate from the steam consuming device.

11. The method of claim 10 wherein the step of forming steam in the steam generator is performed using a heat transfer fluid.

12. The method of claim 10 further comprising a step of providing waste heat to a steam condensate formed by the steam consuming device.

13. The method of claim 10 further comprising a step of delivering additional steam to the steam consuming device at the pressure from a second steam generator.

14. The method of claim 10 wherein the steam consuming device is a steam reboiler of a solvent regenerator.

15. The method of claim 10 wherein the steam has a pressure of equal or less than 50 psia.

16. The method of claim 10 wherein the step of forming steam in the steam generator exceeds a steam demand of the steam consuming device, and further comprising a step of exporting excess steam to a second steam consuming device.

* * * * *